US011226978B2

(12) United States Patent
Tamjidi et al.

(10) Patent No.: US 11,226,978 B2
(45) Date of Patent: Jan. 18, 2022

(54) SYSTEMS AND METHODS FOR DYNAMIC CREATION OF SCHEMAS

(71) Applicant: ServiceNow, Inc., Santa Clara, CA (US)

(72) Inventors: David Tamjidi, San Diego, CA (US); Carmine Mangione-Tran, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 143 days.

(21) Appl. No.: 16/392,260

(22) Filed: Apr. 23, 2019

(65) Prior Publication Data

US 2020/0341994 A1 Oct. 29, 2020

(51) Int. Cl.
*G06F 7/00* (2006.01)
*G06F 16/00* (2019.01)
*G06F 16/25* (2019.01)
*G06F 16/901* (2019.01)
*G06F 16/248* (2019.01)

(52) U.S. Cl.
CPC .......... *G06F 16/252* (2019.01); *G06F 16/248* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,678,887 B1 | 1/2004 | Hallman | |
| 6,799,189 B2 | 9/2004 | Huxoll | |
| 6,816,898 B1 | 11/2004 | Scarpelli | |
| 6,895,586 B1 * | 5/2005 | Brasher | G06F 9/465 709/201 |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |

(Continued)

OTHER PUBLICATIONS

U.S. Appl. No. 15/968,508, filed May 1, 2018, David Tamjidi.

(Continued)

*Primary Examiner* — Tuan A Pham
(74) *Attorney, Agent, or Firm* — Fletcher Yoder PC (57) ABSTRACT

A computing system includes a server. The server is communicatively coupled to a data repository and is configured to store a data in the data repository. The server is further configured to receive as input, via a server communicatively coupled to a data repository and configured to store a data in the data repository, a dynamic schema, the dynamic schema comprising a dynamic object, wherein the dynamic object is representative of information stored in at least one server object. The server is additionally configured to provide an application programming interface (API) to interface with the dynamic object based on the dynamic schema. The server is further configured to retrieve a result when the dynamic object is executed via a call to the API, wherein retrieving the result comprises loading the server object or a portion of the server object into a memory of the server only after the call to the API.

20 Claims, 7 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangaranjan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,172,621 B1 | 10/2015 | Dippenaar |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,753,744 B1 | 9/2017 | Wells et al. |
| 9,766,935 B2 | 9/2017 | Kelkar |
| 9,792,387 B2 | 10/2017 | George |
| 9,804,886 B1 | 10/2017 | Wells et al. |
| 9,805,322 B2 | 10/2017 | Kelkar |
| 9,836,504 B2 | 12/2017 | Graefe et al. |
| 9,852,165 B2 | 12/2017 | Morozov |
| 10,002,203 B2 | 6/2018 | George |
| 2007/0033441 A1* | 2/2007 | Sathe .................. G06F 11/36 714/38.14 |
| 2011/0208692 A1* | 8/2011 | Satpathy .............. G06F 16/283 707/606 |
| 2012/0265742 A1 | 10/2012 | Burckhardt et al. |
| 2013/0232176 A1 | 9/2013 | Plattner et al. |
| 2013/0338972 A1 | 12/2013 | Chao et al. |
| 2014/0366045 A1* | 12/2014 | West .................. G06F 9/44526 719/328 |
| 2015/0161199 A1* | 6/2015 | Pinko .................. H04L 67/306 707/736 |
| 2016/0226946 A1 | 8/2016 | Karaatanassov et al. |
| 2016/0328424 A1 | 11/2016 | Borley et al. |
| 2017/0257433 A1 | 9/2017 | Rosa et al. |
| 2017/0346875 A1* | 11/2017 | Wells .................. G06F 9/5033 |
| 2018/0068001 A1 | 3/2018 | Panwar et al. |
| 2018/0089232 A1* | 3/2018 | Spektor ............... G06N 5/022 |
| 2018/0232403 A1* | 8/2018 | Bhatti ................. G06F 16/252 |
| 2018/0239810 A1* | 8/2018 | Pruitt ................. G06F 16/3328 |

OTHER PUBLICATIONS

"Using GraphQl client with REST API" Author; David C. pub online on Jan. 21, 2017, URL:https://medium.com/@dadc/using-graphql-client-with-rest-api-9c332e5c8eb3 (Year:2017).

"How to wrap a REST API" with GraphQL—A 3-step tutorial, pub online on Feb. 22, 2018, URL: https:/www.prisma.io/blog/how-to-srap-a-rest-api-with-graphql-8bf3fb17547d (Year:2018).

Masters Thesis title "Transformation of REST API to GraphQL, for Open TOSCA" b Eyob Sernere Ghebremicael (Year: 2017).

\* cited by examiner

SYSTEMS AND METHODS FOR DYNAMIC CREATION OF SCHEMAS

BACKGROUND

The present disclosure relates generally to schemas, and more specifically to dynamic creation of schemas.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions. In certain embodiments, cloned data repositories may be created. With this in mind, the following embodiments are directed to improving access to data repositories via dynamic schemas.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable systems and methods that may create a custom API (e.g., query API) via schemas based on a schema definition language (SDL) and that may then enable clients to create custom queries to data based on the custom API. The schemas may include user-defined fields and types that are employed to define information slots. For example, a field may be defined, such as a "User" field that includes certain types, such as a name, a user ID, and custom fields (e.g., user job position, company role(s), and so on). Further, query-based methods are provided that enable clients to specify how clients desire data to be loaded from a query server. Accordingly, clients may specify their data requirements via query language APIs, resulting in declarative data fetching where a client may specific exactly what data it needs via the query API.

The techniques described herein may enable for the dynamic loading of data as the data is consumed. That is, a server providing for data via the query API may parse a schema written in SDL and instead of loading all data into memory at startup the data may be loaded on demand, as described in further detail below. The creation of dynamic loading via the techniques described herein may improve data repository systems, including cloned data repository systems, by enabling on-demand data production and analysis.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "schema definition" may refer to a description of objects (e.g., classes, types, and the like such as a "User" class), relationships between objects, fields provided by the objects (e.g., "User name", "User address") and the like, suitable for defining objects to be queried and/or updated. The schema definition may be written in a SDL, such as GraphQL™ SDL available from the GraphQL Foundation at https://foundation.graphql.org. In certain embodiments, a dynamic query server is provided, suitable for parsing the schema definition and for loading data on-demand (as opposed to on startup) for the defined schema. In one embodiment, the dynamic query server may adhere to a server specification, such as the GraphQL™ specification. Present embodiments are directed to parsing and loading a schema (e.g., using SDL) and then exposing the data associated with the schema on-demand via an API (e.g., via GraphQL™ queries). The dynamic query facility may include a query language used by clients for accessing the data on-demand, and a server-side runtime for provisioning the queries and/or data updates. Accordingly, the dynamic query facility isn't tied to any specific database or storage engine and may more efficiently handle large schemas by using an on-demand loading approach, as further described below.

Figure 1:
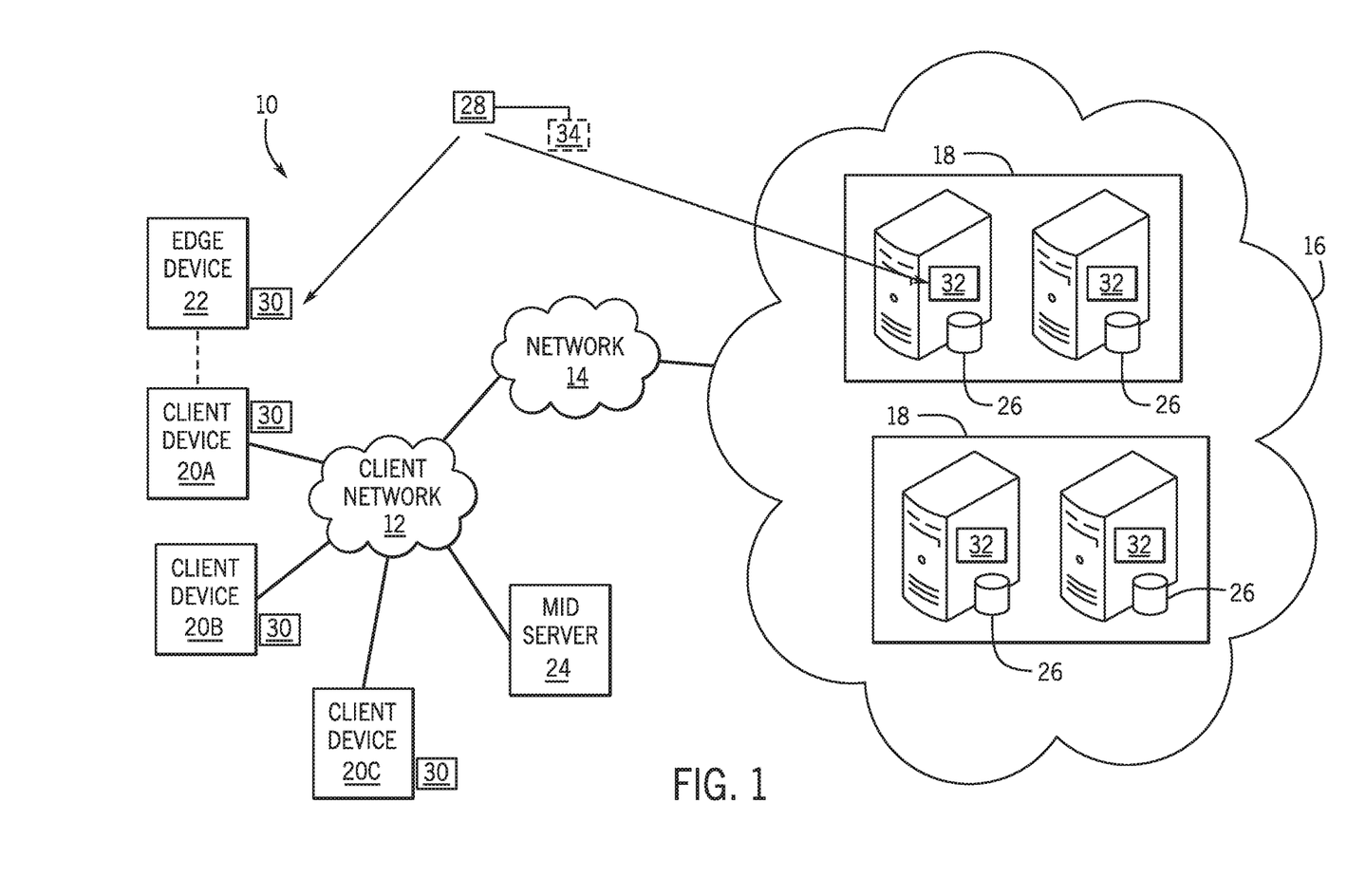
FIG. 1 is a block diagram of an embodiment of a cloud architecture in which embodiments of the present disclosure may operate.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

In the depicted embodiment, a dynamic schema system or facility 28 is provided. The dynamic schema system 28 includes a dynamic client system 30 and a query server 32. In the depicted embodiment, the client system 30 connects with the query server 32 via networks 12, 14. In use, a developer may create a schema 34, for example by using the schema definition language (SDL) to describe certain objects, object relationships, interfaces, and so on, based on data managed by the virtual servers 26. After creation, the schema may be parsed in by the dynamic schema system 28 and an API based on the schema may then be created.

It may be beneficial to describe the APIs created by the dynamic schema system 28 in comparison to a Representational State Transfer (REST) API. The REST API exposes endpoints used by clients to retrieve data. For example, a REST system may use three endpoints, e.g., "/users/<id>", "/users/<id>/blogposts", "/users/<id>/followers" to retrieve, e.g., via three HTTP GET requests, the blog posts and the followers for a given user. The REST API also does not include a schema describing what the data structures that are returned by the endpoints include (e.g., user name, company role, and so on). Because the dynamic schema system 28 is based on a schema (e.g., strongly type schema), the dynamic schema system 28 provides a "contract" specifying data structures and relationships among data structures, among other information, to clients. Accordingly, a client may build a query with improved understanding of the data provided by the schema but still use an endpoint approach.

The schema may be used to define a single endpoint, and then a single HTTP POST request containing the query may be used to retrieve the same data as in the REST's three-endpoint example. A sample query issued from the dynamic client system 30 may be: "Query {User (id: "userid") {name blogposts {title} followers {name}}}" The query server 32 may then provide a response, such as a JavaScript Object Notation (JSON) response, which may mimic the nested structure (as opposed to a flat REST layout response) of the query. An example nested JSON result may be : "{"data": {"User": {"name": "The User with userid", "blogposts": [{title : "Only a blogpost"}], "followers": [{name : "Jason"}, {name : "Jody"}, {name : "Jeff"},]}}}". As compared to REST APIs, the APIs described herein may have single endpoints returning flexible data structures instead of a set of endpoints returning fixed data structures. Accordingly, over and under fetching of data may be minimized or avoided, and the schema may provide added benefits. For example, a frontend developer may now include queries in the clients 30 with improved understanding of the data that dictate data needs and the query server 32 may resolve the queries dynamically (as opposed to loading the entire schema in memory at startup) and return only the data asked for by the client 32. Additionally, development may be improved because front end and back end teams can now develop to the agreed schema.

Figure 2:
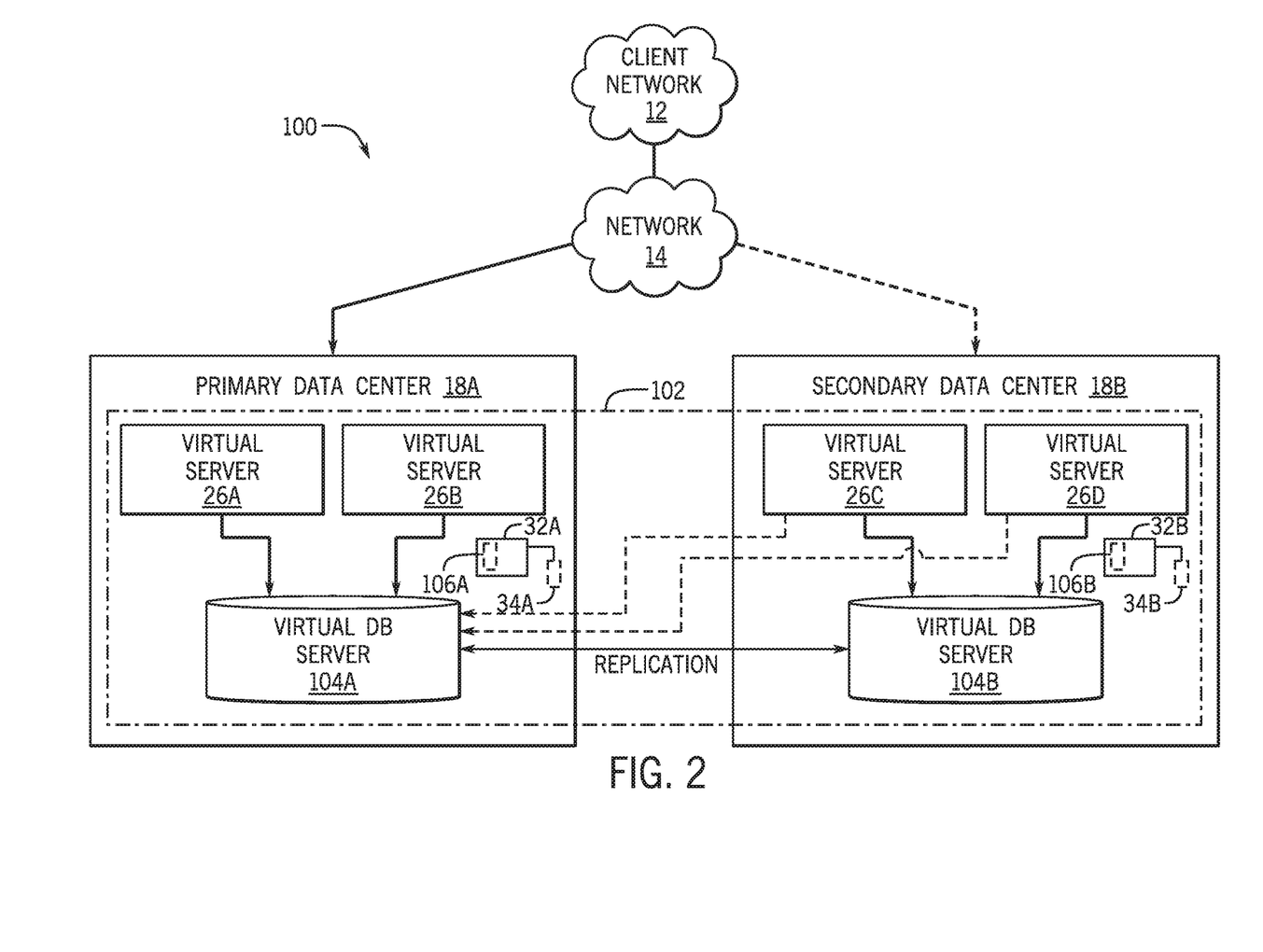
FIG. 2 is a schematic diagram of an embodiment of a multi-instance cloud architecture in which embodiments of the present disclosure may operate.

An example of implementing a customer instance with the techniques described herein within a multi-instance cloud architecture will be discussed in more detail below with reference to FIG. 2. More specifically, FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a simply client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B.

As shown in FIG. 2, the primary virtual database server 104A may replicate data to the secondary virtual database server 104B using, e.g., a Master-Master MySQL Binlog replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

In the depicted embodiment, the dynamic query server system 32 (e.g., query server systems 32A and 32B) is shown. The dynamic query server system 32 may be included in either or both of the servers 26, 104, or be a standalone system operatively coupled to the servers 26 and/or 104. In the depicted embodiment, the dynamic query server system 32 is shown as using the schema 34 to provide for one or more dynamic schema objects 106 (e.g., objects 106A, 106B). That is, the techniques described herein may allow the creation of the dynamic schema objects 106 on-demand instead of loading all schema objects into memory when the schema 34 is initially parsed. By providing for the on-demand loading of the dynamic schema objects 106, the techniques described herein may enable a more efficient and useful application of schema objects. For example, by delaying the loading into memory of the dynamic schema objects 106, the startup time of the dynamic query server system 32 may be improved, and blocking of requests for server 32 services, for example, during a cache flush, would be reduced.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
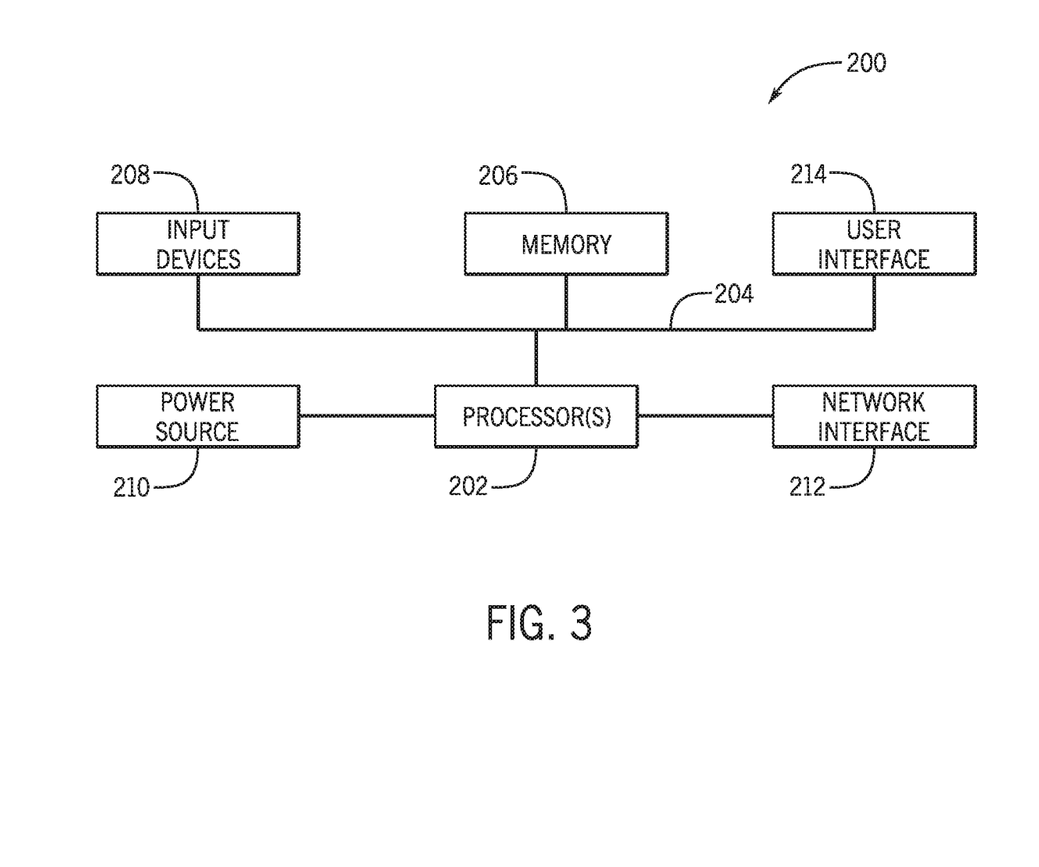
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The memory 206 may be used to store, for example, the dynamic schema objects 106 on-demand, as further described below. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
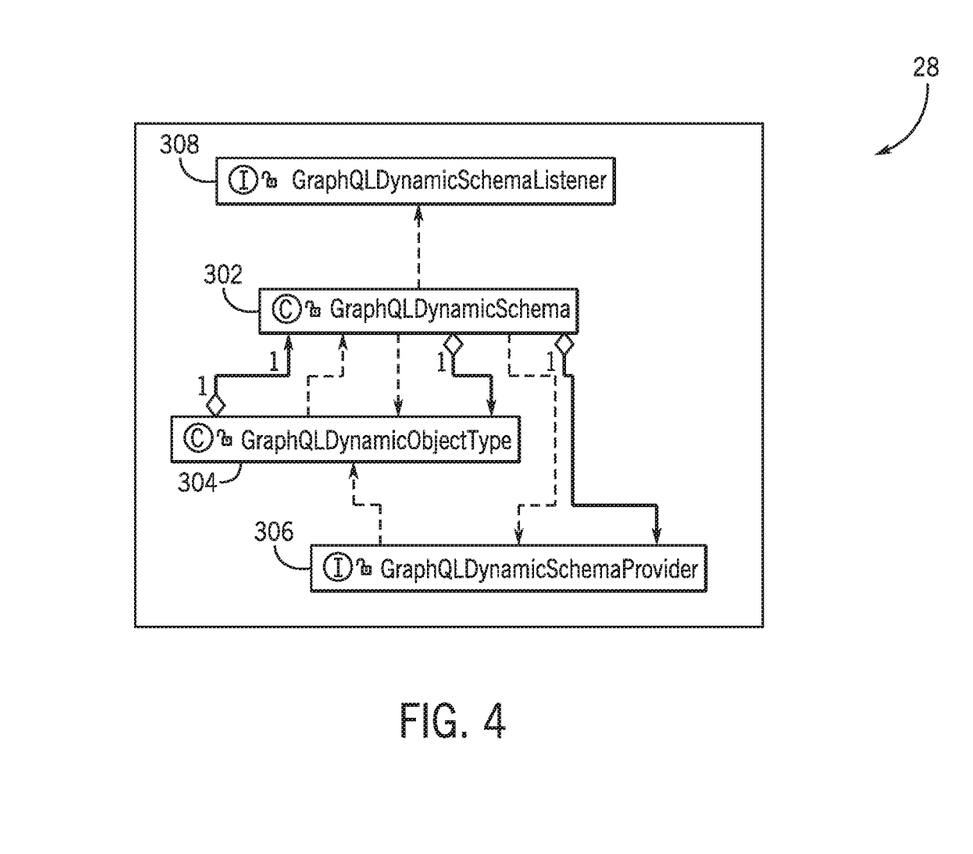
FIG. 4 is a block diagram illustrating an embodiment of an inheritance system suitable for creating custom dynamic schemas, in accordance with an embodiment.

Turning now to FIG. 4, the figure is an inheritance diagram illustrating an embodiment of certain classes and interfaces (e.g., Java-based classes and interfaces) used to implement dynamic schema system 28. More specifically, a GraphQLDynamicSchema class 302 is illustrated, suitable for overloading an immutable or non-dynamic schema class and for providing for certain extended capabilities. For example, the GraphQLDynamicSchema class 302 may participate in processing queries, (e.g., GraphQL™ queries) where a type (e.g., object such as a User) has not been loaded into memory yet or may include incorrect and/or incomplete fields (e.g., UserID of the User). Accordingly, using the GraphQLDynamicSchema, a GraphQLDynamicObjectType class 304 is provided, the GraphQLDynamicSchema may determine if the type is loaded in memory and re-use it, and if it's not loaded in memory, may then load (or collaborate in loading) the object (e.g., User type) into memory. The type may include one or more fields (e.g., akin to a database table having one or more columns). Should the query (e.g., GraphQL™ query) ask for a field that is non-existent or incorrect, a null value may be returned as opposed to causing an error which normally would occur in non-dynamic schema systems that implement GraphQL™ due to normal GraphQL™ request query validation.

A GraphQLDynamicSchemaProvider interface 306 is also shown. During operations of the system 32, the dynamic schema system 28 may determine which of a variety of data providers, e.g., GraphQLDynamicSchemaProviders 306, is suitable to handle a particular type. The selected provider may then be used to provide for objects of a given type, e.g., User type. The GraphQLDynamicSchema class 302 may also implement a GraphQLDynamicSchemaListener interface 308 suitable for listening for certain schema requests, such as changes to the schema 106. Advantageously, the schema 106 may be changed even during operations of the dynamic schema system 28. That is, changes to the schema 106 may occur without the dynamic schema system 28 being shut down, for example, to rebuild the entire schema 106. Instead, the dynamic schema system 28 may dynamically reload objects that may have been updated as the objects are queried, e.g., via a GraphQL™ query. For example, the object may now have different structure, e.g., a "user" object may have had a new type added, e.g., "user employee role", a type removed, a type updated, or a combination thereof. Accordingly, schema 106 objects may be updated more efficiently.

Figure 5:
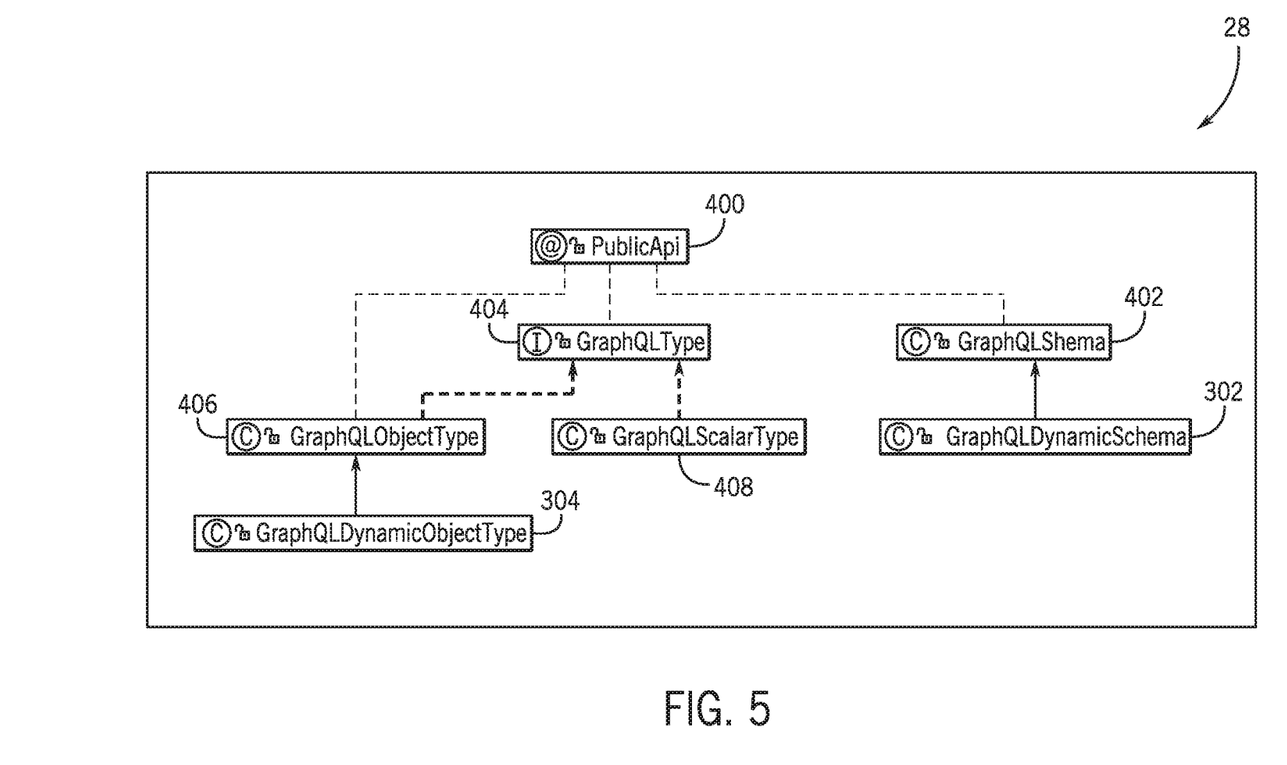
FIG. 5 is a screenshot of an embodiment of an inheritance system suitable for creating "public" dynamic schemas, in accordance with an embodiment.

Turning now to FIG. 5, the figure is an inheritance diagram including embodiments of certain classes and interfaces (e.g., Java-based classes and interfaces) used to implement the dynamic schema system 28. In the depicted embodiment, a public API 400 exposes one or more of objects of the dynamic schema system 28, for example, via certain function calls (e.g., query function). In the depicted embodiment, the GraphQLDynamicSchema 302 overloads a GraphQLSchema class 402, which may be included in the GraphQL™ specification available from GraphQL Foundation at https://foundation.graphql.org.

Traditionally, the GraphQLSchema class 402 provides for immutable (e.g. static) objects. That is, once a schema is developed via the GraphQLSchema class 402, the schema is then built (e.g., compiled), which results in all (or substantially all) objects in the schema being loaded into memory immediately and immutably. By way of contrast, the techniques described herein provide for a combination of static objects (e.g., objects to be loaded into memory once built) and dynamic objects. In certain embodiments, users may specify if an object is static or dynamic via a class, e.g., GraphQLDynamicSchema or GraphQLSchema.

A GraphQLType interface 404 may be included in the GraphQL™ specification and used to derive a GraphQLObjectType class 406 and a GraphQLScalarType class 408. Also shown are the GraphQLDynamicObjectType class 304. Both the GraphQLScalarType class 408 and the GraphQLDynamicObjectType class 304 may inherit from GraphQLType interface 404. In the depicted embodiment, the GraphQLScalarType 408 may be used to define the static objects, while the GraphQLDynamicObjectType class 304 may be used to define the dynamic objects. As mentioned earlier, prefixes, suffixes, or a combination thereof, may be used to provide for static and/or dynamic objects (e.g., GraphQL™ types).

Once the dynamic schema 34 has been through a build process the first time (e.g. compilation and any memory loading of objects) and the resulting dynamic schema 34 objects are ready to provide data, changes to underlying data stores (e.g. tables, columns, views, or combination thereof) for the dynamic schema 34 objects, e.g., objects for the GraphQLDynamicObjectType class 304, may result in the object having a different structure. For example, in one embodiment, an object may represent an underlying database table (e.g., relational database table). Changes to the table, such as removing columns and/or renaming columns, may now result in the object having a different structure than the underlying table. A query to get results from a now deleted column traditionally may have resulted in an error. The techniques described herein may now create objects, e.g., based on the GraphQLDynamicObjectType class 304, that when queried for a missing and/or renamed column may return a null value. Likewise, addition of columns may not result in an error.

By providing for the GraphQLScalarType 408 and the GraphQLDynamicObjectType class 304, the techniques described herein may improve startup times by not loading all of the objects (e.g., GraphQLDynamicObjectType class 304 objects) during startup and by enabling changes without causing an error. Indeed, should an underlying table change, the techniques describe herein may continue providing data for the unchanged columns. Similarly, changes in one table may not affect other tables, and operations may continue unaffected for the other tables.

Figure 6:
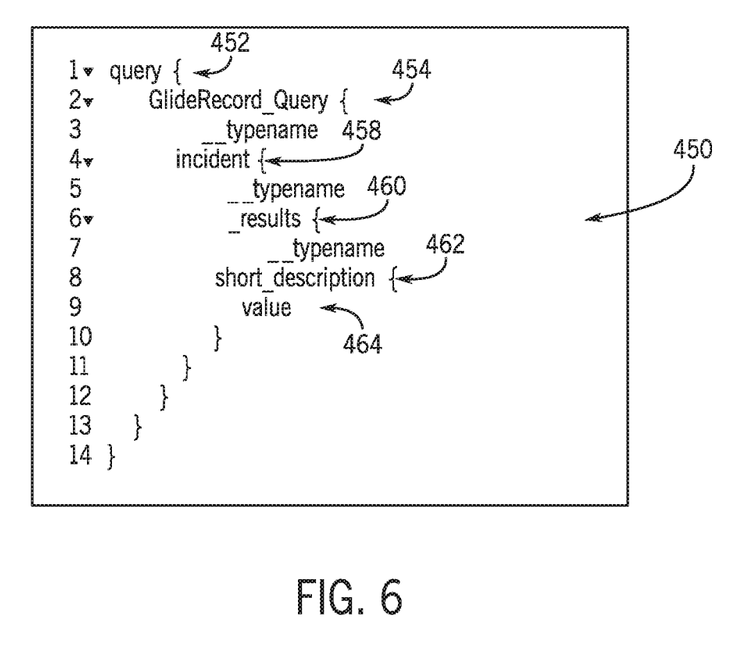
FIG. 6 is an interaction overview diagram illustrating embodiments of interactions between certain components of front-end flow APIs and a client-side code.

It may be beneficial to discuss querying and/or updating information exposed via the dynamic schema. Turning now to FIG. 6, the figure is screenshot illustrating an embodiment of a query 450 (e.g., query object) that may be used to retrieve data that may have been defined via the dynamic schema 34. For example, a client-side code implementations for the clients 30 may use the query 450 to retrieve data via the dynamic server 32.

In the depicted example, a query object 452 may be a GraphQLDynamicObject having a type "QueryType." The query object 452 is shown as requesting a field GlideRecord_Query 454. A provider, such as provider GraphQLDynamicSchemaProvider 306 may then be used, that specializes in providing data having certain types, such as GlideRecord data. The provider may create a GraphQL™ field with the name "GlideRecord_Query" having the type "GlideRecord_QueryType".

An incident field 458 may be requested. For example, the incident field 458 may correspond to an "incident" table (e.g., relational table) in a database operatively coupled to the servers 26, and/or 104. The provider may then create a GraphQL™ field of name "Incident" having a type "GlideRecord_TableType_incident." A "_results" field 460 is also requested for the incident field 458. Accordingly, the provider may create a GraphQL™ field with the name "result" having a type "GlideRecord_TableResultsType_incident." For the _results field 460, a "short_description" 462 with a respective value field 464 are depicted. The provider may create a GraphQL™ field of name "value" with, for example, scalar type. The results may be transmitted via a JSON or via other protocols (e.g., XML, HTTP, and so on).

The public API 400 may process the call and then return the dynamic schema request 450 specifying that results are to be provided via the dynamic schema 110. The dynamic schema request 450 may detail how to access the stored dynamic schema 108 and any corresponding objects 110. In the depicted embodiment, a header 452 may denote that the dynamic schema 108 may be queried, e.g., via SQL. A subheader 454 may then be used to denote that the query would return records, such as relational database table records.

Each returned record may then have a type name 458. For example, "incident" would be the name of the records returned, as shown in label 460. In turn, each "incident" record may have a type name 460. That is, each record may include one or more columns of results. In the depicted embodiment, a single "results" column 462 is shown, having a type name 464, a description 466, and a value 468. The value 468 may be used to store the actual data returned. In some embodiments, data may be returned via JavaScript Object Notation (JSON) data interchange format. It is to be noted that the query 450 may include any number of desired fields with various data types.

Figure 7:
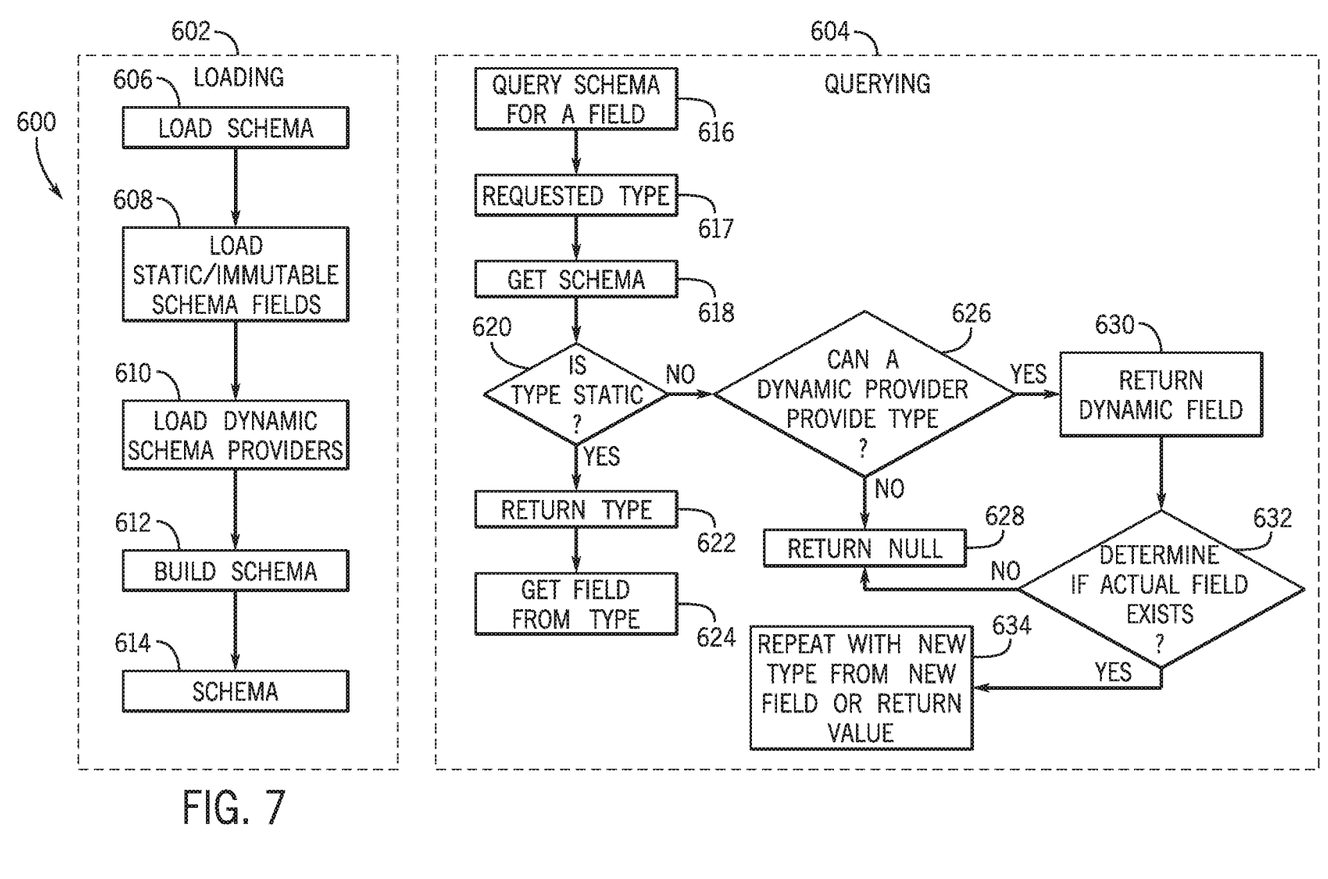
FIG. 7 is a flowchart illustrating embodiment of a process suitable for creating dynamic schemas.

FIG. 7 is a flowchart of an embodiment of a process 600 that may be used to create and apply the dynamic schemas 34. The process 600 may be implemented as computer instructions or code executable via the processor(s) 202 and stored in the memory 206. The process 600, for example, may be executed via the dynamic schema system 28. In the illustrated embodiment, the process 600 may include two subprocesses, a loading process 602 and a querying process 604. The loading process 602 may load schemas and schema objects during the initial schema build, while the querying process 604 may then retrieve (or dynamically load) data from the schema previously built.

For example, the loading process 602 may load (block 606) a schema (e.g., dynamic schema 34) for processing. As mentioned earlier, the schema may include static or otherwise immutable objects, for example, objects that do not use the GraphQLDynamicSchema class 302 but use the GraphQLSchema class 402. The static/immutable objects would be loaded (block 608) during the loading process 602. The loading process 602 may then load (block 610) dynamic schema providers, such as the GraphQLDynamicSchemaProvider 306. As mentioned earlier, the dynamic providers may each provide support for a different type of object, e.g., User, Role, and so on. The process 602 may then build (block 612) the schema, resulting in a built schema 614. That is, the schema 614 may now be ready to provide for data, e.g., via queries.

For example, a schema, e.g., schema 614, may be queried (block 616) for a field (a list of users of type User), e.g., via a query such as query 452. The query may be asking for a type, e.g., "GlideRecord_User" type, by requesting (block 617) a requested type. The querying process 604 may then get (block 618) a schema used to retrieve the requested type, e.g., the schema 614. The schema may then be used to determine (decision 620) is the requested type is a static/immutable type or a dynamic type. If it is determined that the type is a static/immutable type, the process 604 may then return the type (block 622). Data may then retrieved (block 624), e.g., by retrieving (block 624) fields from the returned type and iterating through the fields.

If it is determined (decisions 620) that the type is not static/immutable, but rather a dynamic type, then the process 604 may determine (decision 626) if there exists a dynamic provider (e.g., GraphQLDynamicSchemaProvider 306) that is suitable for proving the desired type. If it is determined (decision 626) that no dynamic provider for the desired type exists, then the process 604 may return null rather than an error.

If it is determined (decision 626) that a dynamic provider for the desired type exists, the dynamic provider (e.g., GraphQLDynamicSchemaProvider 306) may then be used to return a dynamic field, (e.g., GraphQLDynamicObjectType 304). The process 604 may then determine (decision 632) if the dynamic field exists. As mentioned earlier, it may be possible that the field no longer exists because, for example, a column in a table corresponding to the field has been deleted or renamed, a table has been deleted or renamed, and so on. If the field does not exist then the process 604 may return a null. If the field does exist, the process 604 may be repeated (e.g., at block 617)

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server implemented using a memory and a processor communicatively coupled to a data repository and configured to store a data in the data repository, wherein the server is configured to perform operations comprising:
loading a dynamic schema comprising one or more static objects and one or more dynamic schema providers, wherein the one or more dynamic schema providers provide support for one or more dynamic object types, and wherein one or more dynamic objects of the dynamic object types are representative of information stored in at least one server object;
providing an application programming interface (API) to interface with the one or more dynamic objects based on the dynamic schema, wherein the one or more dynamic objects comprise one or more fields representative of one or more columns of a database table;
receiving a call to the API, wherein the call comprises a query function call requesting data comprising values in a respective field of the database table associated with a dynamic object of the one or more dynamic objects;
determining, that the requested data corresponds to a dynamic data type and a corresponding dynamic schema provider of the one or more dynamic schema providers associated with the requested data based on the query function call;
retrieving a result when the dynamic object associated with the requested data is executed via the call to the API, wherein retrieving the result comprises loading the server object or a portion of the server object into the memory of the server only after the call to the API has been made; and transmitting the result comprising the requested data to an additional device, wherein the result comprises one or more results corresponding to the field of the database table.

2. The computing system of claim 1, wherein the dynamic schema is configured to retrieve the result by using a single endpoint.

3. The computing system of claim 1, wherein the server object comprises the database table.

4. The computing system of claim 1, wherein the dynamic schema comprises a graphical query language-based schema.

5. The computing system of claim 4, wherein the dynamic schema includes one or more objects inheriting from a graphical query language class.

6. The computing system of claim 5, wherein the one or more objects comprises a graphical query language dynamic schema object configured to provide the API to interface with the dynamic object.

7. The computing system of claim 6, wherein the graphical query language dynamic schema object provides a listener interface configured to dynamically reload the dynamic object into the memory if the dynamic object has undergone a change in its structure.

8. The computing system of claim 1, wherein the dynamic schema comprises a static or immutable object, and wherein the server is configured to load the static object into the memory upon startup.

9. The computing system of claim 1, wherein the dynamic schema is configured to determine a provider for the dynamic object based on a type for the dynamic object and wherein the result is retrieved based on the provider.

10. The computing system of claim 1, wherein retrieving the result when the dynamic object is executed via a call to the API comprises communicating a graphical query language-based query object via the API, and wherein the query object comprises one or more fields to be provided by the result.

11. A method, comprising:
loading a dynamic schema comprising one or more static objects and one or more dynamic schema providers, wherein the one or more dynamic schema providers provide support for one or more dynamic object types, wherein one or more dynamic objects of the dynamic object types are representative of information stored in at least one server object;
providing an application programming interface (API) to interface with the one or more dynamic objects based on the dynamic schema, wherein the one or more dynamic objects comprise one or more fields representative of one or more columns of a database table; and
receiving a call to the API, wherein the call comprises a query function call requesting data comprising values in a respective field of the database table associated with a dynamic object of the one or more dynamic objects;
determining, that the requested data is a dynamic data type and a corresponding dynamic schema provider of the one or more dynamic schema providers associated with the requested data based on the query function call; and
retrieving a result when the dynamic object associated with the requested data is executed via the call to the API, wherein retrieving the result comprises loading the server object or a portion of the server object into a memory of the server only after the call to the API has been made; and
transmitting the result comprising the requested data to an additional device, wherein the result comprises one or more results corresponding to the field of the database table.

12. The method of claim 11, wherein the dynamic schema is configured to retrieve the result by using a single endpoint.

13. The method of claim 11, wherein the at least one server object comprises the database table.

14. The method of claim 11, wherein the dynamic schema comprises a graphical query language-based schema, and wherein the dynamic schema includes one or more objects inheriting from a graphical query language class.

15. The method of claim 14, wherein the one or more objects comprises a graphical query language dynamic schema object configured to provide the API to interface with the dynamic object, and wherein the graphical query language dynamic schema object provides a listener interface configured to dynamically reload the dynamic object into the memory if the dynamic object has undergone a change in its structure.

16. A non-transitory, computer-readable medium storing instructions executable by a processor of a computing system, the instructions configured to:
loading a dynamic schema comprising one or more static objects and one or more dynamic schema providers, wherein the one or more dynamic schema providers provide support for one or more dynamic object types, and, wherein one or more dynamic objects of the dynamic object types are representative of information stored in at least one server object;
provide an application programming interface (API) to interface with the one or more dynamic objects based on the dynamic schema, wherein the one or more dynamic objects comprise one or more fields representative of one or more columns of a database table; and
receive a call to the API, wherein the call comprises a query function call requesting data comprising values in a respective field of the database table associated with a dynamic object of the one or more dynamic objects;
determining, that the requested data is a dynamic data type and a corresponding dynamic schema provider of the one or more dynamic schema providers associated with the requested data based on the query function call; and
retrieve a result when the dynamic object associated with the requested data is executed via the call to the API, wherein retrieving the result comprises loading the server object or a portion of the server object into a memory of the server only after the call to the API has been made; and
transmitting the result comprising the requested data to an additional device, wherein the result comprises one or more results corresponding to the field of the database table.

17. The computer-readable medium of claim 16, wherein the dynamic schema is configured to retrieve the result by using a single endpoint.

18. The computer-readable medium of claim 16, wherein the at least one server object comprises the database table.

19. The computer-readable medium of claim 16, wherein the dynamic schema comprises a graphical query language-based schema, and wherein the dynamic schema includes one or more objects inheriting from a graphical query language class.

20. The computer-readable medium of claim 19, wherein the one or more objects comprises a graphical query language dynamic schema object configured to provide the API to interface with the dynamic object, and wherein the graphical query language dynamic schema object provides a listener interface configured to dynamically reload the dynamic object into the memory if the dynamic object has undergone a change in its structure.

* * * * *